(12) United States Patent
Takata et al.

(10) Patent No.: US 11,776,711 B2
(45) Date of Patent: Oct. 3, 2023

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Yutaka Takata, Yokkaichi (JP); Shintaro Nambara, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 55 days.

(21) Appl. No.: 16/992,652

(22) Filed: Aug. 13, 2020

(65) Prior Publication Data

US 2021/0057127 A1 Feb. 25, 2021

(30) Foreign Application Priority Data

Aug. 21, 2019 (JP) ................. 2019-151494

(51) Int. Cl.
*H01B 7/282* (2006.01)
*H01B 7/00* (2006.01)

(52) U.S. Cl.
CPC ........... *H01B 7/282* (2013.01); *H01B 7/0045* (2013.01)

(58) Field of Classification Search
CPC ........ H01B 7/0045; H01B 7/282; H02G 1/14; H02G 15/003; H02G 15/08; H02G 15/18
See application file for complete search history.

(56) References Cited

U.S. PATENT DOCUMENTS 4,863,535 A * 9/1989 More ................. H01R 4/70
156/49
4,879,807 A * 11/1989 Roucaute ............ H01R 4/72
29/828

(Continued)

FOREIGN PATENT DOCUMENTS

| JP | 2015-159070 A | 9/2015 |
|---|---|---|
| JP | 2018-032589 A | 3/2018 |
| JP | 2018-073774 A | 5/2018 |

*Primary Examiner* — Timothy J Thompson
*Assistant Examiner* — Rhadames Alonzo Miller
(74) *Attorney, Agent, or Firm* — Oliff PLC (57) ABSTRACT

A wire harness including: a first wire bundle that includes a plurality of wires; a second wire bundle that includes fewer wires than the first wire bundle; a splice body; and a waterproofing cover, wherein: the wires of the first wire bundle and the second wire bundle each include a conductor and an insulating covering that covers an outer circumference of the conductor, and each include an exposed portion at which the conductor is exposed from the insulating covering, at the splice body, the exposed portions of the first wire bundle and the exposed portions of the second wire bundle are bonded, and the waterproofing cover integrally covers the splice body, the outer surfaces of the insulating coverings of the first wire bundle, and the outer surfaces of the insulating covering of the second wire bundle with a resin material.

6 Claims, 4 Drawing Sheets

(56) References Cited

U.S. PATENT DOCUMENTS

| | | | | |
|---|---|---|---|---|
| 6,303,865 | B1* | 10/2001 | Yamamoto | H01R 4/70 |
| | | | | 174/17.08 |
| 7,572,979 | B2* | 8/2009 | Otsuki | H01R 13/5213 |
| | | | | 174/84 R |
| 2012/0247828 | A1* | 10/2012 | Kakuta | B29C 35/0805 |
| | | | | 174/72 A |
| 2015/0096786 | A1* | 4/2015 | Takasu | B32B 7/00 |
| | | | | 174/145 |
| 2017/0243673 | A1* | 8/2017 | Nakashima | C09D 151/08 |
| 2017/0338005 | A1* | 11/2017 | Ito | H02G 1/14 |
| 2018/0109099 | A1* | 4/2018 | Fukumoto | H01B 7/282 |
| 2019/0096543 | A1* | 3/2019 | Itou | H02G 15/18 |
| 2019/0131033 | A1* | 5/2019 | Itou | H01B 7/2825 |

* cited by examiner

WIRE HARNESS

BACKGROUND

The present disclosure relates to a wire harness.

In a wire harness including multiple wires, a splice portion is formed by bonding conductors that are exposed from insulating coverings of the wires to each other using a crimped terminal or the like in some cases. A wire harness including this kind of splice portion is disclosed in, for example, JP 2015-159070A, JP 2018-73774A, JP 2018-32589A, and the like. In some cases, the portion including the splice portion is covered with a material through which water is not likely to pass, such as a resin material, for the purpose of protecting the splice portion from contact with water. In particular, if the wire harness is to be used in an environment in which contact with water is likely to occur, such as an automobile interior, it is important to waterproof the splice portion. For example, JP 2015-159070A and JP 2018-73774A disclose modes in which a waterproofing member that covers the splice portion is provided in this manner. In JP 2015-159070A and JP 2018-73774A, constituent materials of the waterproofing member are studied such that a high waterproofing performance is obtained.

JP 2015-159070A, JP 2018-73774A, and JP 2018-32589A are examples of related art.

If a splice portion of a wire harness is to be provided with a waterproofing material, it is effective to devise the material constituting the waterproofing material as in JP 2015-159070A, and JP 2018-73774A, from the viewpoint of improving the waterproofing property. However, in this type of waterproofing member, the structure of the waterproofing material, such as the dimensions of the portions of the waterproofing member, and the relationship between the waterproofing member and other constituent members of the wire harness are also expected to influence the waterproofing performance. By studying the structure of the waterproofing member covering the splice portion, there is a possibility that the waterproofing performance can be further improved.

An exemplary aspect of the disclosure provides a wire harness that can provide a high waterproofing property to a splice portion at which conductors of multiple wires are bonded.

SUMMARY

A wire harness according to an exemplary aspect of the disclosure includes a first wire bundle that includes a plurality of wires; a second wire bundle that includes fewer wires than the first wire bundle; a splice body; and a waterproofing cover, wherein: the wires of the first wire bundle and the second wire bundle each include a conductor and an insulating covering that covers an outer circumference of the conductor, and each include an exposed portion at which the conductor is exposed from the insulating covering, at the splice body, the exposed portions of the first wire bundle and the exposed portions of the second wire bundle are bonded, the waterproofing cover integrally covers the splice body, the outer surfaces of the insulating coverings of the first wire bundle, and the outer surfaces of the insulating covering of the second wire bundle with a resin material, and a first covering length, which is a length of a region in which the waterproofing cover that covers the outer surfaces of the insulating coverings of the first wire bundle is longer than a second covering length, which is a length of a region in which the waterproofing cover that covers the outer surface of the insulating covering of the second wire bundle.

The wire harness according to the present disclosure can provide a high waterproofing property to a splice body at which conductors of multiple wires are bonded.

BRIEF DESCRIPTION OF THE DRAWINGS

FIGS. 2A and 2B are diagrams showing cross-sections of a first covered region of the above-described wire harness. FIGS. 2A and 2B show two different modes.

DETAILED DESCRIPTION OF EMBODIMENTS

First, embodiments of the present disclosure will be listed and described.

A wire harness according to the present disclosure includes: a first wire bundle; a second wire bundle; a splice portion; and a waterproofing portion. The first wire bundle includes a plurality of wires. The second wire bundle includes fewer wires than the first wire bundle. The wires each include a conductor and an insulating covering that covers an outer circumference of the conductor, and each include an exposed portion at which the conductor is exposed from the insulating covering. At the splice portion, the exposed portions of the first wire bundle and the exposed portion of the second wire bundle are bonded. The waterproofing portion integrally covers the splice portion, the outer surfaces of the insulating coverings of the first wire bundle, and the outer surface of the insulating covering of the second wire bundle with a resin material. A first covering length, which is the length of a region in which the waterproofing portion covers the outer surfaces of the insulating coverings of the first wire bundle is longer than a second covering length, which is the length of a region in which the waterproofing portion covers the outer surface of the insulating covering of the second wire bundle.

In the above-described wire harness, the waterproofing portion integrally covers the outer surfaces of the first wire bundle and the second wire bundle and the splice portion. When a wire harness having this kind of waterproofing portion undergoes a change in temperature, thermal stress is likely to occur between the insulating coverings and the waterproofing portion due to the material constituting the insulating coverings of the wires and the resin material constituting the waterproofing portion having different expansion and contraction behaviors in response to a change in temperature. The greater the number of wires constituting the wire bundle is, the greater the thermal stress is, and the more likely the waterproofing portion is to separate from the outer surfaces of the insulating coverings. However, in the above-described wire harness, the covering length, which is the length of the region covered by the waterproofing portion, is made longer in the first wire bundle, which has a greater number of wires than the second wire bundle. The longer the covering length is, the more the thermal stress at the edges of the waterproofing portion can be reduced. As a result, when the wire harness undergoes a change in temperature, it is possible to suppress a case in which the waterproofing portion separates from the edge and the waterproofing property decreases in the outer surface of the first wire bundle having a greater number of wires.

Here, it is preferable that the first covering length is at least four times the second covering length. In this case, it is easy to effectively suppress a case in which separation caused by thermal stress occurs in the outer surface of the first wire bundle that has a greater number of wires than the second wire bundle when the wire harness undergoes a change in temperature, and thus it is easier to maintain a high waterproofing property.

It is preferable that the maximum thermal stress of the waterproofing portion at at least an edge on the first wire bundle side is smaller than an adhesive strength of the resin material with respect to the insulating covering. For this reason, it is easier to suppress a case in which the waterproofing portion separates from the outer surface of the insulating covering of the wire due to the adhesive strength of the waterproofing portion even if thermal stress occurs at the edge of the waterproofing portion due to a change in temperature. As a result, the waterproofing property achieved by the waterproofing portion is easily maintained even in an environment that undergoes a change in temperature.

It is preferable that the maximum thermal stress of the waterproofing portion at at least the edge on the first wire bundle side is 0.5 MPa or less. In this case, due to the thermal stress at the edge of the waterproofing portion being suppressed to a sufficiently low level, it is possible to effectively suppress separation of the waterproofing portion resulting from the thermal stress even in an environment in which the wire harness undergoes a change in temperature.

It is preferable that the adhesive strength of the resin material with respect to the insulating coverings is 0.5 MPa or more. In this case, the waterproofing portion is firmly adhered to the outer surfaces of the insulating coverings of the wires. For this reason, even if thermal stress occurs in the waterproofing portion due to a change in temperature, a situation in which the waterproofing portion separates from the outer surfaces of the insulating coverings due to the thermal stress is not likely to occur.

It is preferable that the adhesive strength of the resin material with respect to the insulating coverings remains at 0.5 MPa or more in a state after the wire harness has been placed for 500 hours in an environment with a temperature of 85° C. and a humidity of 85% RH. In this case, the resin material constituting the waterproofing portion maintains the high waterproofing property even in a high-temperature environment, and the state in which the waterproofing portion is firmly adhered to the outer surface of the insulating covering of the wire is likely to be maintained. Accordingly, even if thermal stress occurs in the waterproofing portion due to being in a high-temperature environment, it is possible to suppress a case in which the waterproofing portion separates from the outer surfaces of the insulating coverings due to the thermal stress. As a result, a high waterproofing property is maintained even when the wire harness is used in a high-temperature environment.

DETAILS OF EMBODIMENTS OF THE PRESENT DISCLOSURE

Hereinafter, a wire harness according to an embodiment of the present disclosure will be described with reference to the drawings. The wire harness according to the embodiment of the present disclosure includes a splice portion at which two wire bundles are bonded, and a waterproofing portion that covers a region including the splice portion. Note that in the present specification, concepts indicating shapes and positions of members, such as opposite directions and a linear shape, are not limited to geometrically exact concepts, but include divergence of a degree that is allowed in a wire harness and constituent members. Also, the various properties are values that are measured in the atmosphere and at room temperature, unless specifically stated otherwise.

Overview of Structure of Wire Harness

Figure 1:
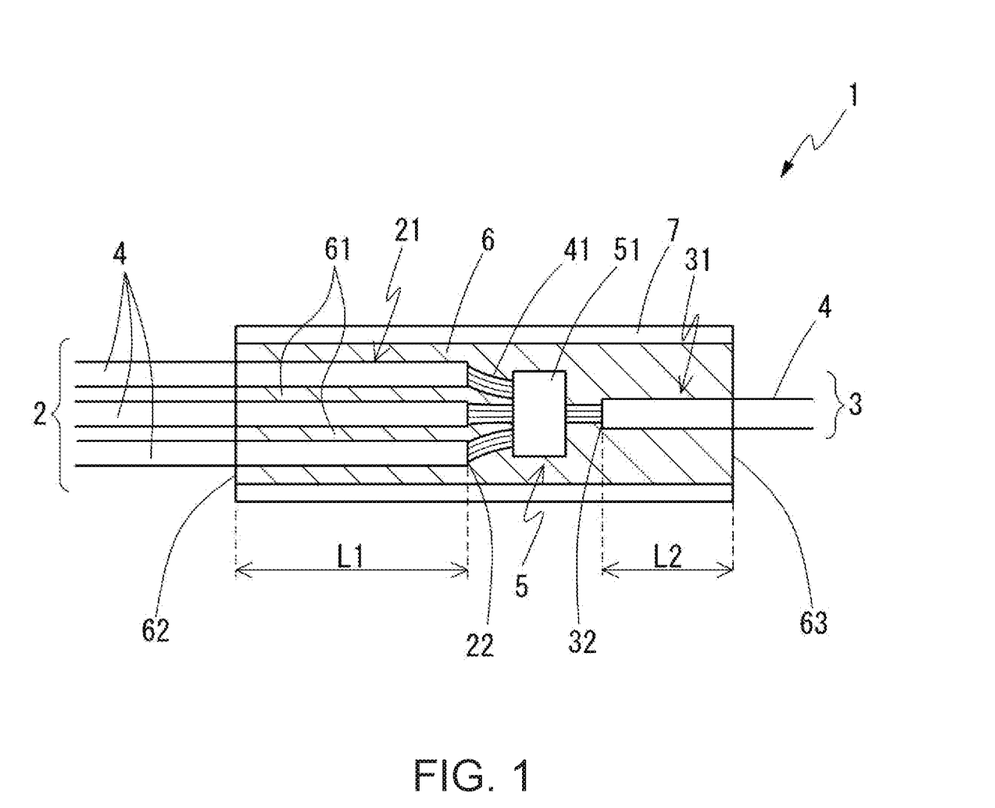
FIG. 1 is a side view showing a wire harness according to an embodiment of the present disclosure. In this drawing, a resin material filling a region enveloped by a sheet member is indicated by diagonal lines.

First, an overview of a structure of a wire harness according to an embodiment of the present disclosure will be described. FIG. 1 shows an overview of a wire harness 1 according to an embodiment of the present disclosure.

The wire harness 1 includes a first wire bundle 2 and a second wire bundle 3. The first wire bundle 2 includes multiple wires 4 and the second wire bundle 3 includes fewer wires 4 than the first wire bundle 2. One or multiple wires 4 may constitute the second wire bundle 3. In the mode shown in the drawings, the first wire bundle 2 includes three wires 4. The second wire bundle 3 includes only one wire 4. In the present specification, a mode including only one wire 4 is also referred to as a wire bundle, as with the second wire bundle 3. In the present embodiment, the wires 4 constituting the first wire bundle 2 and the second wire bundle 3 are all the same.

Figure 2A:
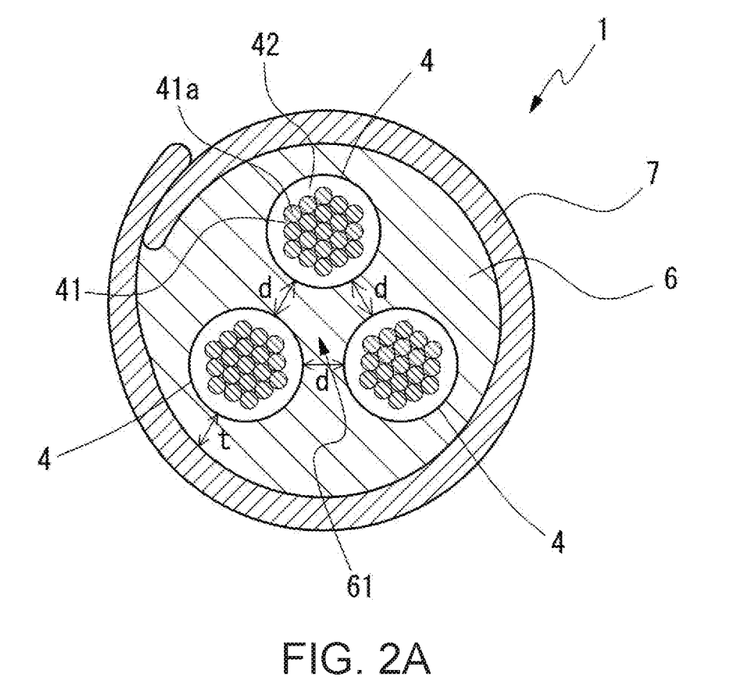
Figure 2B:
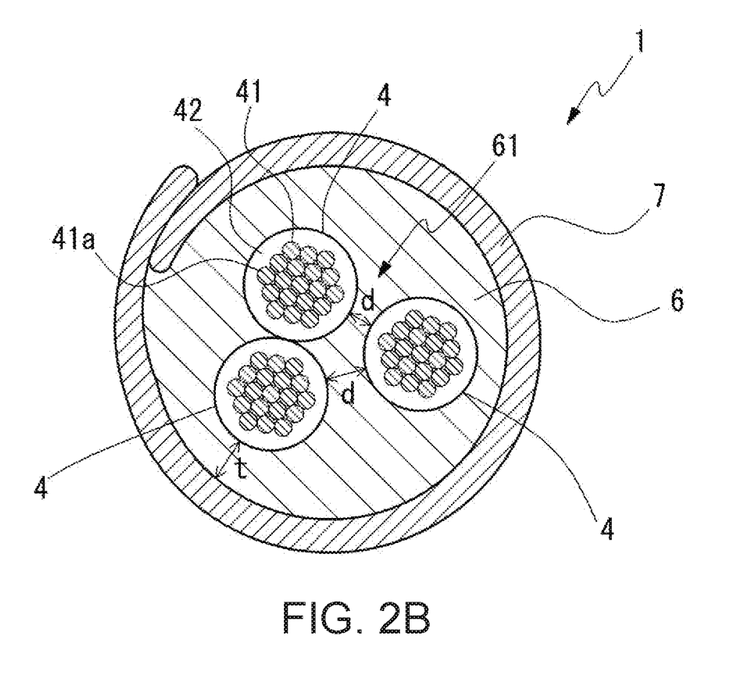

The wires 4 that constitute the first wire bundle 2 and the second wire bundle 3 each include a conductor 41 and an insulating covering 42 covering the outer circumference of the conductor 41 (see FIGS. 2A and 2B). Each wire 4 includes an exposed portion at which the insulating covering 42 is removed and the conductor 41 is exposed from the insulating covering 42. In the present wire harness 1, one (e.g., the one in the center) of the wires 4 constituting the first wire bundle 2 is one wire 4 (main wire) that is continuous with the one wire 4 constituting the second wire bundle 3, and at an intermediate portion of the main wire, the insulating covering 42 is removed to expose the conductor 41, and thus an exposed portion is formed. Exposed portions formed at end portions of the other wires 4 (branch wires) constituting the first wire bundle 2 are bonded to the exposed portion formed at the intermediate portion of the main wire by a splice portion 5 (splice body) that will be described next.

A splice portion 5 is formed between the first wire bundle 2 and the second wire bundle 3. At the splice portion 5, the exposed portions of the wires 4 constituting the first wire bundle 2 and the second wire bundle 3 are mutually bonded. The first wire bundle 2 and the second wire bundle 3 extend in different directions on both sides of the splice portion 5. In the mode shown in the drawings, the first wire bundle 2 and the second wire bundle 3 extend in straight lines in mutually opposite directions on both sides of the splice portion 5. Also, in the mode shown in the drawings, the exposed portions of the wires 4 are bonded at the splice portion 5 through crimping using a crimped terminal 51. Note that in the slice portion 5, if the conductors 41 constituting the exposed portions of the wires 4 can be electrically connected to and physically fastened to each other, the bonding of the exposed portions may be performed using any kind of means, and in addition to the crimped terminal 51, welding such as resistance welding and ultrasonic welding, and bonding using molten metal, such as soldering, can be given as examples. In the present wire harness 1, in the splice portion 5, two branch wires are bonded as the first wire bundle 2 to one main wire that is continuous from the first wire bundle 1 to the second wire bundle 3.

The wire harness 1 further includes a waterproofing portion 6 (waterproofing cover) in which the region including the splice portion 5 is covered with a resin material. The resin material constituting the waterproofing portion 6 integrally covers the splice portion 5, and a first covered region 21 and a second covered region 31 that are located on both sides of the splice portion 5. Here, the first covered region 21 and the second covered region 31 refer to portions at which the conductors 41 of the wires 4 constituting the wire bundles 2 and 3 are covered by the insulating coverings 42 in the wire bundles 2 and 3. That is, the waterproofing portion 6 integrally covers the outer surface of the insulating covering 42 of the first wire bundle 2 and the outer surface of the insulating covering 42 of the second wire bundle 3.

In the wire harness 1 according to the present embodiment, a first covering length L1, which is the length of the region in which the waterproofing portion 6 covers the first covered region 21, is longer than a second covering length L2, which is the length of the region in which the waterproofing portion 6 covers the second covered region 31. The configuration of the waterproofing portion 6, including the definition of the covering lengths L1 and L2 will be described in detail later. The waterproofing portion 6 acts as a waterproofing material that suppresses a case in which water (also including electrolytes; the same applies in the description hereinafter) enters the splice portion 5.

Furthermore, the wire harness 1 includes a sheet member 7. The sheet member 7 envelops the outer circumference of the waterproofing portion 6. The sheet member 7 is not necessarily provided on the wire harness 1, but by providing the sheet member 7, it is possible to easily form the waterproofing portion 6. For example, a light-curable resin composition need only be arranged on the outer surface of a clear sheet member 7, and the region including the splice portion 5 of the wire harness 1 need only be enveloped with the surface of the sheet member 7 on which the resin composition is arranged. Then, by exposing the outer side of the sheet member 7 to light and curing the resin composition, a state in which the region including the splice portion 5 is covered by the waterproofing portion 6 composed of the resin material can be easily formed. The sheet member 7 functions also as a protective member that protects the waterproofing portion 6 from contact with an external object or the like.

Although the materials constituting the portions of the wire harness 1 and the dimensions of the portions of the wire harness 1 are not particularly limited, examples of suitable materials and the like will be described hereinafter. Although the conductor 41 constituting the wire 4 may also be a single wire, it is preferable that the conductor 41 is a group of multiple strands 41a. The metal material constituting the strands 41a is not particularly limited, and copper, a copper alloy, aluminum, and an aluminum alloy can be given as examples thereof. The conductor 41 may be constituted by only strands 41a of one type, or may include strands 41a of two or more types. Also, the conductor 41 may include strands constituted by a material other than a metal material, such as organic fibers, in addition to the metal strands 41a. The insulating covering 42 included in the wire 4 is constituted by an insulating polymer material. Specific examples of the polymer material can include polyolefins such as polypropylene (PP), halogen-based polymers such as polyvinyl chloride (PVC), thermoplastic elastomers, and rubber. These polymer materials may individually constitute the insulating covering 42, or two or more may be mixed together. Various additives may also be added to the polymer material as needed. Examples of additives can include a flame retardant, a filler, and a coloring agent.

Although the cross-sectional area of the conductor of the wire 4 and the thickness of the insulating covering 42 are not particularly limited, for example, the cross-sectional area of the conductor can be in a range of 0.5 mm$^2$ or more and 5 mm$^2$ or less from the viewpoint of effectively using the effect of improving the waterproofing property resulting from mitigating stress in the waterproofing portion 6, or the like, which will be described later. Also, for example, the thickness of the insulating covering 42 can be in a range of 0.2 mm or more and 0.7 mm or less.

The type of the resin material constituting the waterproofing portion 6 is also not particularly limited, as long as it is an insulating polymer material. However, from the viewpoint of easily forming the waterproofing portion 6, it is preferable that the waterproofing portion 6 can be formed by arranging a thermoplastic resin, various curable resins, or the like at a predetermined location in a highly fluid state, and thereafter allowing it to solidify. In particular, it is preferable to use a curable resin as the resin material. Examples of the curable resin can include a light-curable resin, a heat-curable resin, a moisture-curable resin, and a two-component reaction curable resin. From the viewpoint of the ease of forming the waterproofing portion 6, among these resins, it is preferable to use a light-curable resin.

Although the resin type of the resin material constituting the waterproof portion 6 is also not particularly limited, examples thereof can include silicone-based resin, acrylic resin, epoxy-based resin, urethane-based resin, and the like. Among these, it is preferable to use acrylic resin. Examples of light-curable acrylic resin can suitably include urethane (meth)acrylate-based resins, epoxy(meth)acrylate-based resins, polyester (meth)acrylate-based resins, and the like. It is possible to use only one, or two or more types in combination as the resin material constituting the waterproofing portion 6. Various additives may also be added to the resin material as needed. Examples of additives can include a reaction starting agent, a flame retardant, a filler, and a coloring agent.

If the wire harness 1 includes the sheet member 7, the material constituting the sheet member 7 is not particularly limited, as long as it is an insulating polymer material. Examples of polymer materials can include polyolefins such as polypropylene, halogen-based polymers such as PVC, polyesters such as polyethylene terephthalate, and polyamides such as nylon. Various additives may also be added to the polymer material as needed. Also, from the viewpoint of ease when arranging and fixing the sheet member 7 on the predetermined region of the outer circumference of the splice portion 5 via the waterproofing portion 6, it is preferable that the sheet member 7 is constituted by adhesive tape having an adhesion layer on which a bonding agent or an adhesive is arranged. In this case, the surface on which the adhesion layer is provided is the surface that is to be in contact with the waterproofing portion 6. If the resin material constituting the waterproofing portion 6 is a light-curable resin, it is preferable that the sheet member 7 is composed of a transparent material through which the light used to cure the resin material passes, such that the resin material is cured through exposure to light via the sheet member 7.

Configuration of Waterproofing Portion

Here, the waterproofing portion 6 provided in the wire harness 1 will be described in detail. As described above, the waterproofing portion 6 integrally covers the splice portion 5, the first covered region 21, and the second covered region 31 with a resin material in the wire harness 1.

In the wire harness 1 according to the present embodiment, the first covered length L1, which is the length of the region in which the waterproofing portion 6 covers the outer surfaces of the insulating coverings 42 of the first wire bundle 2 in the first covered region 21 is longer than the second covering length L2, which is the length of the region in which the waterproofing portion 6 covers the outer surface of the insulating covering 42 of the second wire bundle 3 in the second covered region 31 (L1>L2). Here, the first covering length L1 and the second covering length L2 respectively correspond to the distance from the position of the edge 22 of the covered region 21 opposing the splice portion 5 to the position of the edge 62 of the waterproofing portion 6 and the distance from the position of the edge 32 of the covered region 31 opposing the splice portion 5 to the position of the edge 63 of the waterproofing portion 6 along the axial direction in the first wire bundle 2 and the second wire bundle 3. Due to the first covering length L1 for the first wire bundle 2, which has a greater number of wires 4, being longer than the second covering length L2 for the second wire bundle 3, which has fewer wires 4, the waterproofing property achieved by the waterproofing portion 6 with respect to the splice portion 5 can be ensured, even if the splice portion 5 of the wire harness 1 or a portion in the vicinity thereof undergoes a change in temperature.

In the wire harness 1, when the splice portion 5 or a portion in the vicinity thereof undergoes a change in temperature, the waterproofing portion 6 and the insulating coverings 42 of the wires 4 expand and contract. However, the waterproofing portion 6 and the insulating coverings 42 are normally constituted by different materials, and the expansion and contraction behaviors in response to a change in temperature are different from each other. In this case, when undergoing a change in temperature, the waterproofing portion 6 and the insulating coverings 42 are less likely to follow each other's deformation, and thermal stress occurs between the waterproofing portion 6 and the insulating coverings 42. Due to this thermal stress, the waterproofing portion 6 separates from the outer surfaces of the insulating coverings 42 in some cases. In many cases, the separation occurs at the edges 62 and 63 of the waterproofing portion 6. In particular, after the waterproofing portion 6 and the insulating coverings 42 undergo heating, separation of the waterproofing portion 6 is likely to occur accompanying contraction that occurs during cooling. This is because various curable resins that are commonly used as waterproofing materials often have smaller thermal contraction rates than materials that are often used as the insulating coverings 42 of the wires 4, such as PVC or polyolefin, and thus when the waterproofing portion 6 is formed using such a waterproofing material, the waterproofing portion 6 is not likely to follow the contraction of the insulating coverings 42.

The thermal stress that occurs between the waterproofing portion 6 and the insulating coverings 42 during a change in temperature increases when the number of the wires 4 that constitute one wire bundle 2 (3) and are covered by the waterproofing portion 6 is greater. This is because the total volume of the insulating covering 42 that expands and contracts due to a change in temperature is greater. That is, the greater the number of the wires 4 constituting the wire bundle 2 (3) is, the greater the thermal stress that occurs between the wire bundle 2 (3) and the waterproofing portion 6 during a change in temperature is, and the more likely it is that separation of the waterproofing portion 6 will occur due to thermal stress.

The thermal stress that occurs between the insulating coverings 42 of the wires 4 and the waterproofing portion 6 during a change in temperature can be mitigated in the resin material constituting the waterproofing portion 6. Through this stress mitigation, separation of the waterproofing portion 6 can be made less likely to occur. The effect of the stress mitigation in the waterproofing portion 6 increases the longer the length of the region surrounding the insulating covering 42 of one wire bundle 2 (3) is, that is, the longer the covering length L1 (L2), which is the length of the waterproofing portion 6 covering the covered region 21 (31), is. This is because the amount of the resin material that can contribute to the stress mitigation increases. As a result, the maximum thermal stress at the edge 62 (63) of the waterproofing portion 6 decreases the longer the covering length L1 (L2) of the waterproofing portion 6 is. This is shown through a simulation in working examples hereinafter as well.

Note that the maximum thermal stress at the edge 62 (63) of the waterproofing portion 6 indicates the maximum value of the thermal stress that is observed at the surface (end surface) exposed at the edge 62 (63) of the waterproofing portions 6, which is observed when the temperature is changed at each position of the surface, and indicates that the smaller the value is, the greater the effect of the stress mitigation at the waterproofing portion 6 is. The greater the effect of the stress mitigation is and the smaller the maximum thermal stress at edge 62 (63) of the waterproofing portion 6 is, the more it is possible to suppress a case in which the waterproofing portion 6 separates at the outer surface of the insulating covering 42 using the edge 62 (63) as the origin.

As described above, the greater the number of the wires 4 constituting one wire bundle 2 (3) is, the more likely separation resulting from thermal stress is to occur during a change in temperature at the boundary between the wire bundle 2 (3) and the waterproofing portion 6 covering the covered region 21 (31) of the wire bundle 2 (3). However, in the waterproofing portion 6 of the wire harness 1 according to the present embodiment, the covering length L1 for the first covered region 21 with a greater number of wires 4 constituting the wire bundle 2 is longer than the covering length L2 for the second covered region 31 with fewer wires 4 constituting the wire bundle 3, and thus the effect of stress mitigation in the waterproofing portion 6 acts more significantly in the first covered region 21 than in the second covered region 31. In this case, the thermal stress that occurs due to there being many wires 4 in the first covered region 21 is reduced through stress mitigation, and the maximum thermal stress that occurs at the edge 62 of the waterproofing portion 6 on the first covered region 21 side can be suppressed to a small amount. As a result, it is possible to suppress a case in which the waterproofing portion 6 separates from the outer surface of the wire 4 at the edge 62 on the first covered region 21 side.

In this manner, due to the waterproofing portion 6 having the longer covering length L1 in the first wire bundle 2 that has a greater number of wires 4, the wire harness 1 according to the present embodiment can maintain the state in which the waterproofing portion 6 closely adheres to the insulating coverings 42 and has a high waterproofing property, even after undergoing a change in temperature. Due to the fact that the high waterproofing property can be maintained even during a change in temperature, the present wire harness 1 can be suitably applied in an environment that is likely to come into contact with water and frequently undergoes a change in temperature, such as an automobile interior.

The longer the first covering length L1 is, the greater the effect of suppressing separation of the waterproofing portion 6 due to stress mitigation in the first covered region 21 is. For example, if the first covering length L1 is set to be at least 4 times, at least 5 times, or at least 7 times the second covering length L2, or if the number of the wires 4 of the first wire bundle 2 is N times the number of the wires 4 of the second wire bundle 3, separation of the waterproofing portion 6 in the first covered region 21 can be effectively suppressed as long as the first covering length L1 is at least N times or at least 1.5N times the second covering length L2. It is preferable that the first covering length L1 is set to at least 15 mm, or more preferably at least 20 mm. Although an upper limit of the first covering length L1 is not particularly provided, from the viewpoint of avoiding a case in which the first covering length L1 becomes excessively long, the first covering length L1 is preferably at most 12 times the second covering length L2, in a range in which the effect of suppressing separation of the waterproofing portion 6 in the first covered region 21 is not saturated. Note that if the second covering length L2 is too short, there is a possibility that it will not be possible to suppress separation of the waterproofing portion 6 in the second covered region 31, and therefore, for example, it is preferable that a second covering length L2 that is at least 4 times the thickness of the insulating covering 42 is ensured, and it is more preferable that a second covering length L2 that is at least 5 times the thickness of the insulating covering 42 is ensured.

The number of the wires 4 constituting the first wire bundle 2 and the second wire bundle 3 are not particularly limited, as long as the first wire bundle 2 has a greater number of wires 4 than the second wire bundle 3. However, the greater the number of the wires 4 constituting the first wire bundle 2 is, and the more significantly the numbers of the wires 4 in the first wire bundle 2 and the second wire bundle 3 differ from each other, the greater the effect of suppressing separation of the waterproofing portion 6 in the first region 21 by making the first covering length L1 longer than the second covering length L2 is. The number of the wires 4 constituting the first wire bundle 2 is preferably three or more. Also, it is preferable that the number of the wires 4 constituting the first wire bundle 2 is at least two times, or more preferably at least three times the number of the wires 4 constituting the second wire bundle 3.

As described above, the smaller the maximum thermal stress at the edges 62 and 63 of the waterproofing portion 6 is, the easier it is to suppress a case in which the waterproofing portion 6 separates from the outer surface of the wire 4. The maximum thermal stress at the edges 62 and 63 of the waterproofing portion 6 is preferably 0.7 MPa or less, and more preferably 0.5 MPa or less at at least the edge 62 on the first covered region 21 side, and furthermore at the edge 63 on the second covered region 31 side. In this case, the waterproofing portion 6 is likely to maintain a sufficient waterproofing property with respect to an envisioned change in temperature in the wire harness 1 that is used in an automobile. Although the magnitude of the maximum thermal stress at the edges 62 and 63 of the waterproofing portion 6 can be reduced by increasing the covering lengths L1 and L2 as described above, the maximum thermal stress also depends on the specific resin composition constituting the waterproofing portion 6. The maximum thermal stress at a specific position of the waterproofing portion 6 can be estimated through, for example, a simulation using computer aided engineering (CAE).

Also, if thermal stress occurs at the edges 62 and 63 of the waterproofing portion 6, separation is less likely to occur the more firmly the waterproofing portion 6 adheres closely to the insulating coverings 42 of the wires 4. Accordingly, it is preferable that the maximum thermal stress of the waterproofing portion 6 is smaller than the adhesive strength of the resin material constituting the waterproofing portion 6 with respect to the insulating coverings 42 at at least the edge 62 on the first covered region 21 side, and more preferably also at the edge 63 on the second covered region 31 side. In this case, even if thermal stress occurs at the edges 62 and 63 of the waterproofing portion 6 in some cases when a change in temperature is undergone, the waterproofing portion 6 is not likely to separate from the outer surfaces of the insulating coverings 42 and easily maintains a high waterproofing property. The adhesive strength of the resin material can be measured as, for example, the tensile shear adhesive strength, in conformity with JIS K 6850.

The adhesive strength of the resin material constituting the waterproofing portion 6 with respect to the insulating coverings 42 is preferably large, and is preferably 0.5 MPa and more preferably 1.0 MPa. Also, although some resin materials constituting the waterproofing portion 6 degenerate in a high-temperature environment and the adhesive strength decreases, from the viewpoint of effectively suppressing reduction of the waterproofing property during a change in temperature, it is preferable to use, as the resin material constituting the waterproofing portion 6, a resin material that can maintain a high adhesive strength even in a high-temperature environment. Specifically, it is preferable that the adhesive strength of the resin material constituting the waterproofing portion 6 with respect to the insulating coverings 42 maintains 0.3 MPa or more, and more preferably 0.5 MPa or more in a state after both are adhered and placed for 500 hours in an environment with a temperature of 85° C. and a humidity of 85% RH.

In order to protect the splice portion 5 from contact with water or the like, the waterproofing portion 6 needs to cover the entire circumference of the splice portion 5, but it is preferable that the waterproofing portion 6 covers not only the splice portion 5 but also the entire circumferences of the covered regions 21 and 31 on both sides. Even if the sheet member 7 is arranged on the outer circumference of the waterproofing portion 6, it is preferable that the resin material is arranged covering the entire circumferences of the splice portion 5 and the covered regions 21 and 31 between the sheet member 7 and the splice portion 5 and between the sheet member 7 and the covered regions 21 and 31, and thus the waterproofing portion 6 is formed. Due to the waterproofing portion 6 being arranged on the entire circumferences of the splice portion 5 and the covered regions 21 and 31, the amount of the resin material that surrounds the wire bundles 2 and 3 and contributes to the mitigation of thermal stress increases, and it is easier to improve the waterproofing property of the waterproofing portion 6. Also, it is possible to effectively protect the splice portion 5 from the occurrence of damage due to contact with an external object, and from a reduction in insulation. Note that from the viewpoint of sufficiently utilizing these effects, it is preferable that the thickness of the waterproofing portion 6 on the outer circumferences of the covered regions 21 and 31 is 50% or more, or more preferably 100% or more, 120% or more, or 150% or more of the outer diameter of the wires 4 at a distance (distance t in FIGS. 2A and 2B) from the outer surface of the wires 4 constituting the covered regions 21 and 31 to the outer edge of the waterproofing portion 6. It is not likely that the effect of improving the waterproofing property resulting from thermal stress mitigation will be further improved even if the thickness of the waterproofing portion 6 is increased beyond that thickness.

Although the waterproofing portion 6 may also merely cover the first wire bundle 2 and the entire outer circumference of the second wire bundle 3 in a cylindrical shape in a case in which the second wire bundle 3 includes multiple wires 4 in the covered regions 21 and 31, it is preferable that the resin material covers the outer circumferential region of the wire bundle 2 as indicated by the cross-section of the wire harness 1 at the first covered region 21 in FIGS. 2A and 2B, and that the inter-wire filling portion 61 obtained by filling the region between the wires constituting the wire bundle 2 with a resin material is included. That is, it is preferable that a gap (shown as distance d in the drawings) is included between at least two adjacent wires 4, and the resin material fills the gap. In the mode shown in FIG. 2A, the resin material fills the entirety of the region between the wires 4 and thus the inter-wire filling portion 61 is formed. In the mode shown in FIG. 2B, the resin material fills a region between some of the wires 4 and thus the inter-wire filling portion 61 is formed.

Due to the waterproofing portion 6 including the inter-wire filling portion 61, the area of contact between the resin material and the wire 4 increases in the waterproofing portion 6, and the adhesion of the waterproofing portion 6 with respect to the wires 4 can be increased. Also, due to the existence of the inter-wire filling portion 61, the amount of resin material that surrounds the wires 4 and contributes to the mitigation of thermal stress increases, and therefore when a change in temperature is undergone, the effect of mitigating the thermal stress and suppressing the separation of the waterproofing portion 6 improves. Accordingly, due to the inter-wire filling portion 61 being formed, the waterproofing property achieved by the waterproofing portion 6 can be further improved. In particular, as shown in FIG. 2A, an excellent effect of improving the waterproofing property is obtained by forming the inter-wire filling portion 61 in the entire region between the wires.

WORKING EXAMPLES

Hereinafter, working examples will be shown. Here, the relationship between the covering length of the waterproofing portion and the thermal stress was studied through a computer simulation. Also, changes in the adhesive strength of the resin material in a high-temperature environment was actually measured, and the relationship between the adhesive strength and the thermal stress of the waterproofing portion was studied. Note that the present disclosure is not limited to these working examples.

[1] Relationship Between Covering Length of Waterproofing Portion and Thermal Stress Test Method The relationship between the covering length of the waterproofing portion covering the region including the splice portion in the wire harness and the maximum thermal stress at the edges of the waterproofing portion was studied using a computer simulation.

The simulation was performed using CAE analysis. The maximum thermal stress that occurs at the edges of the waterproofing portion of the wire harness was estimated using thermal stress analysis according to a finite element method.

A wire harness 1 similar to that shown in FIG. 1 was used as the model to be simulated. The numbers of the wires constituting the wire bundles 2 and 3 were three for the first wire bundle 2 and one for the second wire bundle 3. The second covering length L2 of the second wire bundle 3 was fixed to 3 mm, and simulation was performed while changing the first covering length L1 of the first wire bundle 2. The distances from the center of the crimped terminal 51 constituting the splice portion 5 to the edges 22 and 32 of the first covered region 21 and the second covered region 31 were each 8 mm. The sheet member 7 was omitted from the model.

Wires 4 having the sizes shown in Table 1 below were used. The constituent material of the insulating coverings was PVC. The four wires 4 used in one model were all the same.

TABLE 1

| | Conductor cross-sectional area [mm$^2$] | Conductor outer circumference [mm] | Insulating covering thickness [mm] | Wire outer circumference [mm] |
|---|---|---|---|---|
| Wire A | 0.5 | 1.0 | 0.3 | 1.6 |
| Wire B | 0.85 | 1.2 | 0.3 | 1.8 |
| Wire C | 1.25 | 1.5 | 0.3 | 2.1 |
| Wire D | 2.0 | 1.8 | 0.4 | 2.6 |

An acrylic resin was applied as the resin material constituting the waterproofing portion 6. Hereinafter, properties of the acrylic resin will be listed along with properties of the PVC constituting the insulating coverings. Note that the acrylic resin applied here corresponds to a resin material used in subsequent actual measurement of the adhesive strength.

Acrylic Resin
  Viscosity (85° C.): 7 mPa
  Young's modulus (room temperature): 30 mPa
  Poisson's ratio: 0.4
  Linear expansion coefficient: 150 ppm
PVC (Wire Covering)
  Young's modulus (room temperature): 8 MPa
  Young's modulus (85° C.): 2 MPa
  Poisson's ratio: 0.4
  Linear expansion coefficient: 280 ppm As shown in FIG. 2A, in the first covered region 21 of the wire harness 1, a gap with a distance d of 0.1 mm was provided between each of the three wires 4 and the adjacent wires 4, and the inter-wire filling portion 61 was formed by filling the gap with the resin material. Also, a thickness t of the waterproofing portion 6 on the outer circumferential portion of the first covered region 21 was 0.5 mm.

Test Results

Figure 3:
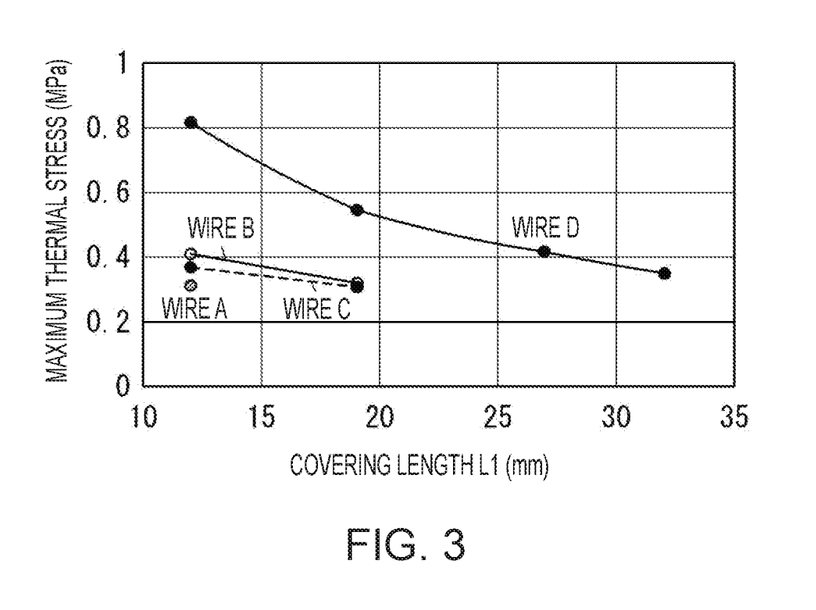
FIG. 3 is a diagram showing a relationship between a covering length of a waterproofing portion and maximum thermal stress at an edge of the waterproofing portion, obtained through simulation.

FIG. 3 shows a relationship between the covering length (first covering length L1) of the waterproofing portion and the maximum thermal stress at the edge of the waterproofing portion on the first covered region side, which were estimated through simulation. The horizontal axis indicates the covering length, and the vertical axis indicates the result of analyzing the maximum thermal stress. Results are shown for a case in which wires A to D with different sizes shown in Table 1 above are used.

Upon viewing the results for the case of using the wire D in FIG. 3, it can be understood that the maximum thermal stress at the edges decreases the longer the covering length of the waterproofing portion is. A similar trend is observed also for the case of using the wire B and the wire C. It is understood that this trend is the result of the amount of resin material that can contribute to the mitigation of thermal stress between the resin material and the insulating covering of the wire increasing the longer the covering length of the waterproofing portion is. Due to this, it can be said that even if there is a large number of wires constituting the wire bundle and a large amount of thermal stress is likely to occur, the thermal stress can be effectively mitigated by increasing the covering length of the waterproofing portion.

Upon comparing the maximum thermal stresses in the cases of using the four types of wires with different sizes, a trend is observed in which the maximum thermal stress increases the larger the cross-sectional area of the conductor of the wire is and the thicker the insulating covering is. This trend is caused by the stress that occurs between the insulating covering and the waterproofing portion increasing the greater the volume of the insulating covering is. Also, the amount by which the maximum thermal stress is reduced by increasing the covering length increases the greater the cross-sectional area of the conductor of the wire is, and the thicker the insulating covering is. This indicates that the effect of stress mitigation resulting from increasing the amount of the resin material constituting the waterproofing portion is more prominently obtained when the volume of the insulating covering is greater and a large amount of thermal stress occurs.

Regarding a case in which wires D with a large amount of data are used, upon studying the relationship between the covering length and the maximum thermal stress in further detail, the reduction range of the maximum thermal stress with respect to the change in the covering length increases in a region in which the covering length is relatively short, and when the covering length is 15 mm or more, the maximum thermal stress is reduced to 80% or less and the value is 0.7 MPa or less compared to the case in which the covering length is 12 mm. The maximum thermal stress of 0.7 MPa is approximately equal to the adhesive strength of the acrylic resin having the following evaluated effects after high-temperature endurance for 500 hours. Furthermore, when the covering length is set to 20 mm or more, the maximum thermal stress is reduced to 65% or less of that in the case where the covering length is 12 mm, and the maximum thermal stress is 0.5 MPa or less. The maximum thermal stress of 0.7 MPa is approximately equal to the adhesive strength of the acrylic resin having the following evaluated effects after high-temperature endurance for 1000 hours. In the cases of using the wires A to C with smaller sizes than the wire D, the maximum thermal stress is sufficiently less than the adhesive strength of 0.5 MPa in a region with a covering length of 15 mm or more. Based on this result, it can be said that the maximum thermal stress at the edges of the waterproofing portion can be effectively reduced by setting the covering length to 15 mm or more in the case where the conductor cross-sectional area is 2 $mm^2$ or less and a wire with a thickness of an insulating covering of 0.4 mm or less is used.

[2] Changes in Adhesive Strength of Resin Material in a High-Temperature Environment Test Method Here, the adhesive strength of a resin material constituting the waterproofing portion was measured, and changes therein resulting from high-temperature endurance were studied.

A light-curable acrylic resin composition was used as the resin material. The acrylic resin composition was obtained by mixing 50 parts by mass of polycarbonate-based urethane acrylate oligomer and 50 parts by mass of isobornyl acrylate, and adding 0.3 parts by mass of diphenyl(2,4,6-trimethoxybenzoyl)phosphine oxide and 1.5 parts by mass of 1-hydroxycyclohexyl phenyl ketone as photoinitiators to the mixture.

A test piece obtained by arranging the above-described resin composition between two PVC plate surfaces and curing the resin material through exposure to ultraviolet light was prepared as a test piece for adhesive strength measurement. The tensile shear adhesive strength was measurement by performing a shear adhesion test in conformity with JIS K 6850 on the test piece.

The measurement of the adhesive strength was performed also in a state after high-temperature endurance. The high-temperature endurance conditions were a temperature of 85° C. and a humidity of 85% RH. The test piece was placed for a predetermined amount of time in the high-temperature endurance conditions, cooled to room temperature, and thereafter the adhesive strength was measured similarly to the description above.

Test Results

Figure 4:
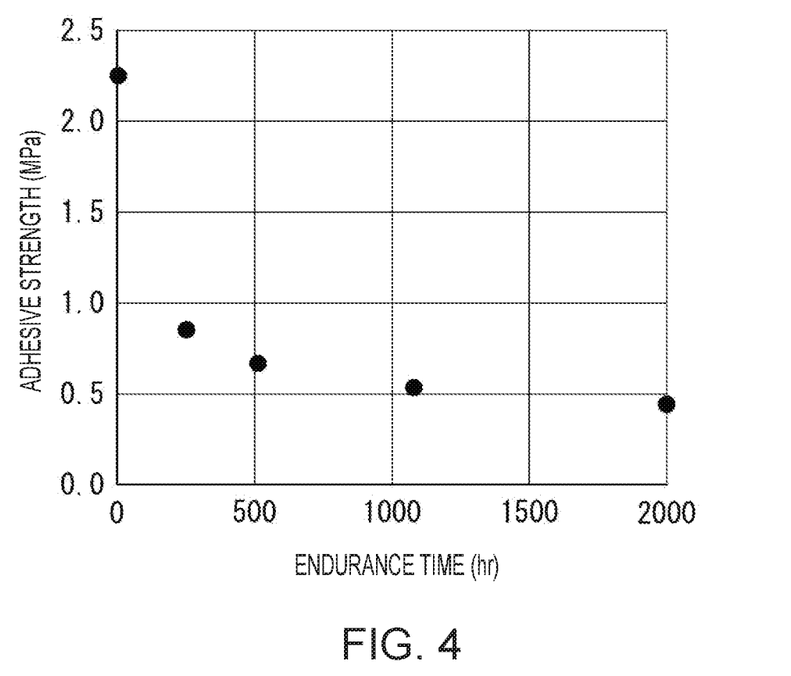
FIG. 4 is a diagram showing changes in adhesive strength of an acrylic resin with respect to polyvinyl chloride during high-temperature endurance, obtained through actual measurement.

FIG. 4 shows the result of measuring changes in the adhesive strength accompanying high-temperature endurance. In the drawing, the horizontal axis indicates the endurance time, that is, the amount of time for which the test piece was placed in the high-temperature endurance conditions, and the vertical axis indicates the values of the adhesive strength measured with respect to the endurance times. The point of an endurance time of 0 is the result of measuring a test piece in an initial state prior to performing high-temperature endurance.

According to FIG. 4, due to undergoing the high-temperature endurance, the adhesive strength of the resin material decreases. Furthermore, the reduction of the adhesive strength increases as the endurance time increases. In the initial state, the adhesive strength is 2.0 MPa or more, whereas the adhesive strength reduces to about 0.7 MPa upon undergoing high-temperature endurance for 500 hours. Thereafter, the reduction in the adhesive strength becomes slight, but the adhesive strength is about 0.5 MPa upon undergoing high-temperature endurance for 2000 hours. If the waterproofing portion of the wire harness is formed using a resin material that can maintain an adhesive strength of 0.5 MPa or more upon undergoing high-temperature endurance for 500 hours, such as the resin material used in this test, it can be said that the state in which the waterproofing portion is adhered to the insulating covering is maintained, and it is easier to maintain the waterproofing property, even if thermal stress occurs between the waterproofing portion and the insulating covering of the wire in an environment exposed to a high temperature, as in the high-temperature endurance conditions employed in this test.

Although an embodiment of the present disclosure was described in detail above, the present disclosure is not limited in any way to the above-described embodiment, and various modifications are possible without departing from the gist of the present disclosure.

What is claimed is:
1. A wire harness comprising:
a first wire bundle that includes a plurality of wires;
a second wire bundle that includes fewer wires than the first wire bundle, each of the wires of the first wire bundle and each of the wires of the second wire bundle including:
a conductor,
an insulating covering that covers an outer circumference of the conductor, and an exposed portion that is exposed from the insulating covering;
a splice body at which the exposed portions of the first wire bundle and the exposed portions of the second wire bundle are bonded; and
a waterproofing cover formed of a resin material that integrally covers:
the splice body,
outer surfaces of the insulating coverings of the first wire bundle, and
outer surfaces of the insulating coverings of the second wire bundle,
wherein:
a first covering length is defined as a length of a region that the waterproofing cover covers the outer surfaces of the insulating coverings of the first wire bundle,
a second covering length is defined as a length of a region that the waterproofing cover covers the outer surface of the insulating coverings of the second wire bundle,
the first covering length is longer than the second covering length, and
the first wire bundle includes a first number of wires, the second wire bundle includes a second number of wires, and a first difference between the first number of wires and the second number of wires determines a second difference between the first and second covering lengths.

2. The wire harness according to claim 1, wherein
a maximum thermal stress of the resin material of the waterproofing cover at at least an edge of the first wire bundle side is less than an adhesive strength of the resin material of the waterproofing cover at the respective insulating covering.

3. The wire harness according to claim 1, wherein
a maximum thermal stress of the resin material of the waterproofing cover at at least an edge of the first wire bundle is 0.5 MPa or less.

4. The wire harness according to claim 1, wherein
an adhesive strength of the resin material of the waterproofing cover with respect to the insulating coverings is 0.5 MPa or more.

5. The wire harness according to claim 1, wherein
an adhesive strength of the resin material of the waterproofing cover with respect to the insulating coverings is structured to remain at 0.5 MPa or more in a state after the wire harness has been placed for 500 hours in an environment with a temperature of 85° C. and a humidity of 85% RH.

6. The wire harness according to claim 1, wherein the first number of wires is at least two times the second number of wires and the first covering length is at least two times the second covering length.

* * * * *